United States Patent [19]

Berglind

[11] Patent Number: 4,922,255
[45] Date of Patent: May 1, 1990

[54] ARRANGEMENT FOR MEASURING SPEEDS

[75] Inventor: Eilert Berglind, Täby, Sweden

[73] Assignee: Stiftelsen Institutet för Mikrovågsteknik vid Tekniska Högskolan i Stockholm, Kista, Sweden

[21] Appl. No.: 285,879

[22] PCT Filed: Mar. 25, 1988

[86] PCT No.: PCT/SE88/00149

§ 371 Date: Dec. 1, 1988

§ 102(e) Date: Dec. 1, 1988

[87] PCT Pub. No.: WO88/07686

PCT Pub. Date: Oct. 6, 1988

[30] Foreign Application Priority Data

Apr. 2, 1987 [SE] Sweden ............................... 8701390

[51] Int. Cl.⁵ ............................................. G01S 13/58
[52] U.S. Cl. ..................................... 342/104; 342/117
[58] Field of Search ......................... 342/104, 117, 108

[56] References Cited

U.S. PATENT DOCUMENTS 3,147,477  9/1964  Dickey, Jr. .
4,106,017  8/1978  Roeder et al. .
4,107,680  8/1978  Kaplan .
4,176,352  11/1979  Tyler .
4,426,647  1/1984  Tomasi ................................. 343/8

FOREIGN PATENT DOCUMENTS 59-81573   5/1984  Japan .
59-83075   5/1984  Japan .
59-203973  11/1984  Japan .

Primary Examiner—Thomas H. Tarcza
Assistant Examiner—Mark Hellner
Attorney, Agent, or Firm—Nies, Kurz, Bergert & Tamburro

[57] ABSTRACT

An arrangement for measuring speeds between a first and a second object with the aid of microwave signals and including a microwave generator which is connected to a transmitter antenna, and two receiver antennae which are preferably placed on respective sides of the transmitter antenna for receiving microwave signals reflected against an object and each of which receiver antennae is connected to a respective receiver channel, the channels being connected to a correlator for correlating the signals received by the receiver antennae, the mutual time difference of said signals corresponding to the relative speed between the objects. According to the invention the microwave generator (11) is also connected to a respective mixer (13, 14, 15, 16) in each of the receiver channels, to which respective mixers (13-16) respective receiver antennae (6, 7) are connected. The outputs of respective mixers (13-16) are connected to an envelope detector (19, 20) which is intended to detect the envelope of respective signals, there being formed two phase independent signals which are compared in the correlator (12).

6 Claims, 2 Drawing Sheets

ARRANGEMENT FOR MEASURING SPEEDS

The present invention relates to an arrangement for measuring speeds with the aid of microwave signals.

The use of microwave signals for measuring the relative speeds, or velocities, of two objects is known, inter alia, from Swedish Patent Specification No. 7307800-8. It is also known from this patent specification to use a microwave transmitter and two microwave receivers and to effect a correlation between the received signals such as to determine velocity on the basis of a time displacement between the signals.

The use of microwave signals affords several important advantages. One advantage is that such systems function well in dirty environments, while another advantage resides in the relatively long range or reach of such systems in comparison with systems which utilize, e.g., light.

Microwave systems, however, are also encumbered with a number of drawbacks.

One serious problem is that the system is dependent on differences in distances between the two receivers and the object against which the microwaves are reflected, due to the fact that the signals received in the receivers are phase dependent, these phase-dependent signals being correlated in accordance with known systems.

Such systems may be used to measure the speed of an automotive vehicle in relation to the ground. When the vehicle in question is a tractor or some other type of vehicle moving across uneven ground, the distance between respective receivers and the ground will vary. When the speed of an aircraft is measured from the aircraft, a change in attitude of the aircraft relative to the horizontal will result in a change in the distance between respective receivers and the ground.

The distance dependency consisting of such changes in distances between respective receiver antennae and the ground either gives rise to an erroneous correlating result or simply prevents correlation of the signals. The use of phase-dependent signals and their correlation is thus highly disadvantageous.

Furthermore, the correlators used to correlate phase dependent signals of microwave frequency are relatively expensive.

Another problem is that constant, relatively powerful reflexions are obtained from the immediate surroundings of the arrangement on a vehicle, such as permanent vehicle fixtures for example. The reflexes are often powerful in relation to the signals reflected against the object, e.g. against the ground.

The present invention solves the aforesaid problems, and is particularly beneficial in that the aforesaid distance dependency is eliminated.

The present invention thus relates to an arrangement which is intended for measuring speeds between a first and a second object with the aid of microwave signals and which comprises a microwave generator connected to a transmitter antenna, and two receiver antenna which are preferably placed on respective sides of the transmitter antenna and which are intended to receive microwave signals reflected against an object, and in which arrangement each receiver antenna is connected to a respective receiver channel and said channels are connected to a correlator for correlating the signals received on the receiver antennae, the mutual time difference of said Signals corresponding to the speed of said objects in relation to one another, the arrangement being characterized in that said microwave generator is also connected to a respective mixer in each of the receiver channels, respective receiver antennae being connected to respective mixers; and in that the outputs of respective mixers are connected to an envelope detector which detects the envelope of respective signals, there being formed two phase-independent signals which are compared in the correlator.

The invention will now be described in more detail with reference to exemplifying embodiments thereof illustrated in the accompanying drawings, in which FIG. 1 is a schematic view of an arrangement which includes a transmitter and two receivers;

Figure 1:
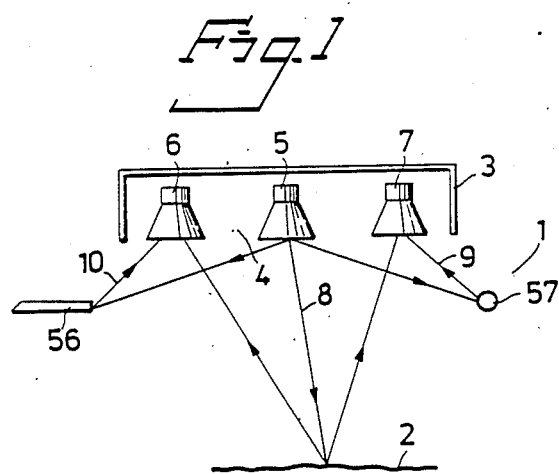
FIG. 1 illustrates schematically an arrangement for measuring speeds between a first object 1, e.g. an automotive vehicle, and a second object, e.g. the ground.

FIG. 1 illustrates schematically a housing 3 having an opening 4 which faces the second object 2. Facing towards the opening are a transmitter antenna 5 and two receiver antenna 6, 7. Each receiver antenna is located on a respective side of the transmitter antenna. According to one preferred embodiment, the antennae 5, 6, 7 are located in mutually the same place, along a straight line with the receiver antennae 6, 7 placed equidistant from the transmitter antenna 5.

Figure 2:
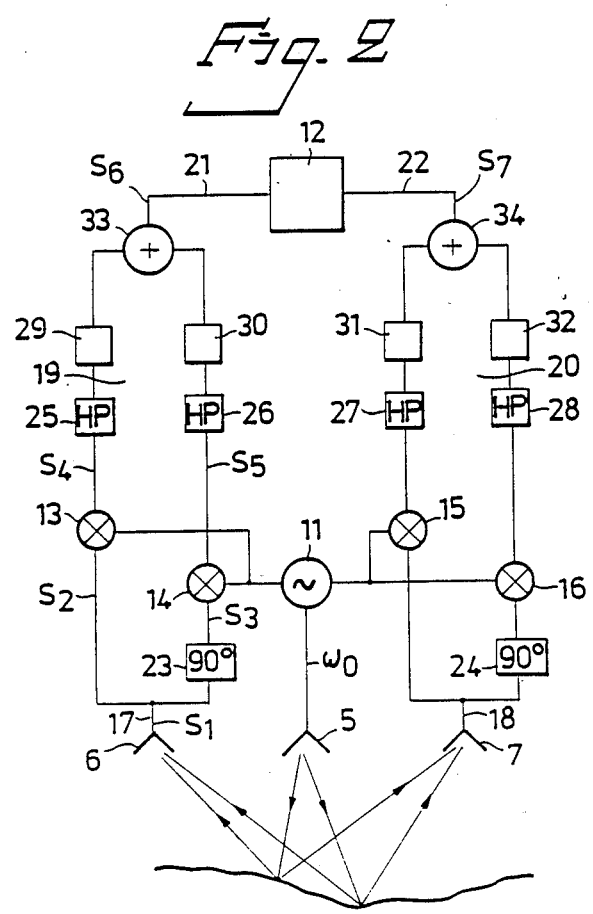
FIG. 2 is a block schematic of an arrangement in which homodyne envelope detection is employed.

As illustrated in FIGS. 1 and 2, the transmitter 5 is intended to transmit a signal 8 which is reflected against the second object and received by the receiver antennae.

The relatively strong reflections mentioned in the introduction may emanate from surfaces in the immediate vicinity of the arrangement, e.g. adjacent vehicle parts 56, 57, and are illustrated by lines 9, 10. These reflections are thus received by the receiver antennae.

FIG. 2 is a block schematic which illustrates a first embodiment of the invention.

The arrangement includes a microwave generator 11 which is connected to the transmitter antenna 5. The arrangement further includes a correlator 12 for correlating the signals which are received on the receiver antennae 6, 7 and the mutual time difference of which corresponds to the relative speed between the objects 1; 2, as is well known per se. Since the correlator 12 used may comprise any known correlator suitable for the purpose intended, the correlator construction will not be described in detail here.

According to the invention, the microwave generator 11 is also connected to respective mixers 13, 14; 15, 16 in each of the receiver channels 17, 18. The respective receiver antennae 6, 7 are connected to respective mixers 13, 14; 15, 16.

The outputs of respective mixers 13, 14; 15, 16 are connected to an envelope detector, generally referenced 19, 20 in FIG. 2, which is intended to detect the envelope of the signals received in respective receiver channels.

As shown herebelow, detection of the envelope of the received signal results in two phase-independent signals 21, 22, which are compared in the correlator 12.

This eliminates the varying-distance dependency between respective receiver antennae and the ground, or the dependency on a constant difference between the objects, e.g. when an aircraft is inclined to the plane of the ground.

Because the two signals sent to the correlator are not phase dependent, many different types of inexpensive commercially available correlators can be used, as opposed to a correlator which is designed to correlate phase-dependent signals.

Furthermore, in some instances, e.g. when the arrangement is mounted on a tractor which is driven on an uneven surface, it would be impossible to correlate the signals if the signals sent to the correlator were phase dependent, since the distances between respective receiver antennae and the ground would constantly change.

With reference to FIG. 2, the microwave generator generates a frequency of, e.g., 2450 MHz. The transmitter signal is reflected against the ground 2 and is received by the two antennae 6, 7. Two receiver channels 17, 18 are configured, each of which includes a receiver antenna which is connected to two mutually parallel mixers 13, 14 and 15, 16 respectively. In the case of the illustrated embodiment, the microwave generator 11 is connected directly to the mixers 13-16. The microwave generator thus constitutes a local oscillator.

The reflected and received signal $S_1$ can be expressed as $$S_1 = (x_1(t) + A_1) \cos(\omega_o t + \phi_1) + (y_1(t) + B) \sin(\omega_o t + \phi_1)$$

where $\phi_1$ is the phase angle, $x1$ and $y1$ are signal components deriving from reflection against the ground, and $A_1$ and $B_1$ are constant or slowly varying signal components deriving from direct reflections (10) from vehicle parts or the like.

The phase angle $\phi$ is unknown, since it is dependent on the distances between transmitter, ground and receiver.

The transmitter microwave frequency is referenced $\omega_o$.

The aforesaid direct reflections are often strong in relation to signal components deriving from ground reflections.

Furthermore the direct reflections vary slowly in relation to the signal variations deriving from ground reflection.

Connected to one mixer in respective channels is a phase-shifting circuit which is intended to phase shift the signals so that the signals $S_4$, $S_5$ downstream of respective mixers 13, 14; 15, 16 in respective channels are quadrature to one another.

In the exemplifying embodiment of FIG. 2, there is provided in each of the receiver channels 17, 18, between the receiver antenna 6; 7 and one of said mixers 14; 16, a phase-shifting circuit 23; 24 which is intended to shift the phase of the received signal $S_1$ through 90°.

The signal $S_1$ is thus divided into two signals, namely $S_2$ and $S_3$, where $S_2$ is identical to $S_1$.

The signal $S_3$ can be expressed as $$S_3 = -(x_1(t) + A_1) \sin(\omega_o t + \phi_1) + (y_1(t) + B_1) \cos(\omega_o t + \phi_1)$$

Obtained on the outputs of respective mixers 13, 14, in which the signals $S_2$ and $S_3$ are mixed with the signal $\cos \omega_o t$ from the microwave generator, are signals $S_4$ and $S_5$, which can be expressed as $$S_4 = (x_1(t) + A_1) \cos \phi_1 + (y_1(t) + B_1) \sin \phi_1$$

$$S_5 = -(x_1(t) + A_1) \sin \phi_1 + (y_1(t) + B_1) \cos \phi_1$$

According to one preferred embodiment of the invention high-pass filters 25-28 are incorporated immediately downstream of the mixers, for filtering-off low-frequency variations on the received microwave signal and thus low-frequency variations on the signals $S_4$ and $S_5$.

The high-pass filters 25,26 thus give an elimination of $A_1$ and $B_1$ in the signals $S_4$ and $S_5$. Arranged downstream of the high-pass filters 25-28 are respective squaring circuits 29-32 which square the signal from respective mixers 13-16 subsequent to high-pass filtering the signal in a high-pass filter, in accordance with the preferred embodiment.

The two squaring circuits 29,30 and 31, 32 in each of the two receiver channels 17, 18 are connected to an addition or summation circuit 33, 34 in each of the receiver channels. The addition circuit 33; 34 is intended to add together the squared signals.

The squaring circuits and the addition circuits may be of any desired known kind.

Subsequent to passing the signals $S_4$ and $S_5$ through a high-pass filter, squaring the signals and summation of the signals, there are obtained two signals $S_6$, $S_7$, of which $S_6$ can be expressed as $$S_6 = x_1^2(t) + y_1^2(t)$$

i.e. a phase-independent signal is obtained. The signal $S_6$ is the envelope squared. As will be seen from the above expression for $S_6$, the signal $S_6$ does not include the phase angle $\phi$ included in the expressions $S_1$ and $S_3$ above.

Analogously, signal $S_7$ is obtained in the other receiver channel downstream of the addition circuit 34, this signal being expressed as $$S_7 = x_2^2(t) + y_2^2(t)$$

which signal is also phase-independent, since the phase angle $\phi_2$, which corresponds to $\phi_1$ and which is normally separated therefrom, has been eliminated.

The outputs of respective addition circuits 33; 34 which contain the signal $S_6$ and $S_7$ respectively, are connected to the correlator 12, in which there is correlated two phase-independent signals which, because they have been high-pass filtered, do not contain signal components deriving from direct reflections 9, 10.

Figure 3:
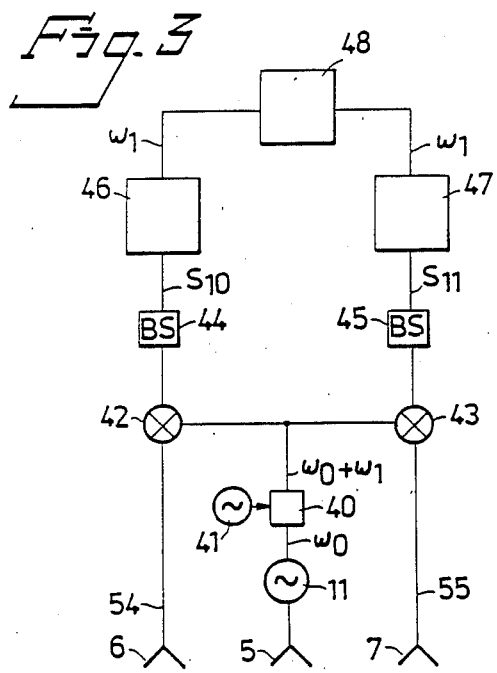
FIG. 3 is a block schematic of an arrangement in which hetrodyne envelope detection is employed.

FIG. 3 is a block schematic of a second embodiment of the invention, where heterodyne envelope detection is employed as opposed to the homodyne envelope detection employed in the embodiment according to FIG. 2.

The embodiment according to FIG. 3 incorporates a side-band modulator 40 which includes an oscillator 41 between the microwave generator 11 and a mixer 42, 43 in each of two receiver channels 54, 55. The sideband modulator 40 is constructed to produce a sideband of frequency $\omega_o \neq \omega_1$, where $\omega_o$ is the frequency of the microwave generator and $\omega_1$ is the frequency of the oscillator 41 of the sideband modulator 40. The sideband is applied to the mixers 42, 43, therewith to form a signal having the carrier frequency $\omega_1$.

Arranged downstream of respective mixers 42, 43 is a band-stop or band-elimination filter 44, 45 which filters out the frequency $\omega_1$ and low frequency variations corresponding to A and B around the frequency $\omega_1$ and which is constructed to allow a higher-frequency variation around the frequency $\omega_1$ to pass through. The higher-frequency variation constitutes the useful signal, which represents signal variations due to variations in ground level. This filtering-off of low-frequency variations around the frequency $\omega_1$ eliminates the effect of the direct reflections 9, 10, as mentioned above.

Similarly to the embodiment concerning homodyne envelope detection, the signals $S_{10}$, $S_{11}$ in the two receiver channels downstream of the band-stop filters 44, 45 can be expressed as $$S_{10} = x_1(t) \cdot \cos(\omega_1 t + \phi_1) + y_1(t) \cdot \sin(\omega_1 t + \phi_1)$$

$$S_{11} = x_2(t) \cdot \cos(\omega_1 t + \phi_2) + y_2(t) \cdot \sin(\omega_1 t + \phi_2)$$

After processing these expressions trigonometrically there is obtained $$S_{10} = \sqrt{x_1^2(t) + y_1^2(t)} \cdot \cos(\omega_1 t + \phi_1'(t))$$

$$S_{11} = \sqrt{x_2^2(t) + y_2^2(t)} \cdot \cos(\omega_1 t + \phi_2'(t))$$

where $\phi_1^1(t)$ and $\phi_2^1$ respectively are dependent on $x_1$, $y_1$ and $x_2$, $y_2$ respectively, which are time dependent. The frequency $\omega_1$ is given a high value in relation to the time variation in $\sqrt{x_1^2(t) + y_1^2(t)}$ and $\sqrt{x_2^2(t) + y_2^2(t)}$.

The frequency $\omega_1$ may, for instance, have the value of 1 MHz. The frequency $\omega_o$ of the microwave generator is, for instance, 2450 MHz.

The dependency of this phase angle $\phi_1^1(t)$ and $\phi_2^1(t)$ is eliminated, however, by the provision of a suitable, known envelope detector 46, 47 downstream of respective bandpass filters 44, 45.

Respective envelope detectors 46, 47 are intended to take the term $\sqrt{x_1^2(t) + y_1^2(t)}$ and $\sqrt{x_2^2(t) + y_2^2(t)}$ from the signals $S_{10}$ and $S_{11}$ respectively, where terms constitute the envelopes of the input signal of the envelope detector. The envelope detectors 46, 47 are connected to a correlator 48 which correlates the output signals from the envelope detectors 46, 47.

Two phase-independent signals are thus fed to the correlators 12, 48.

Each correlator 12, 48 is constructed to form, in a known manner, the expression R according to $$R_{1,2}(\Delta T) =$$

-continued
$$\frac{1}{T} \int_0^T [x_1^2(t - \Delta T) + y_1^2(t - \Delta T)][x_2^2(t) + y_2^2(t)]dt$$

Figure 4:
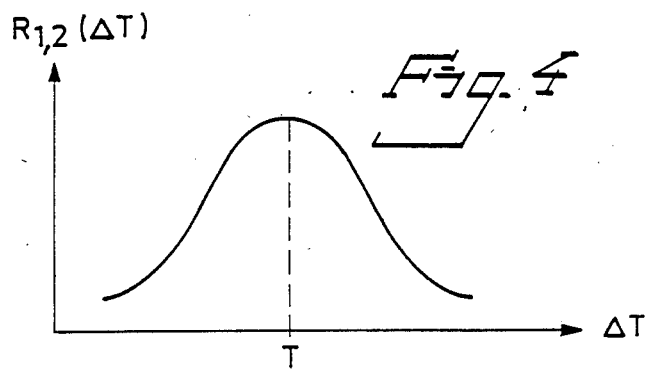
FIG. 4 is a graph.

If the time-displacement between the two signals arriving at the correlator is equal to T, there is obtained a maximum for $R_{1,2}(T)$ in a relationship between $R_{1,2}(\Delta T)$ and $\Delta T$ according to FIG. 4.

The correlator thus evaluates the time difference T for which the function $R_{1,2}(\Delta T)$ has a maximum.

This time difference T corresponds to the relative speed of the objects.

Simple and inexpensive correlators which operate in accordance with the aforesaid principle are available commercially.

In the case of the embodiments aforedescribed a transmitter antenna has a receiver antenna arranged on both sides thereof.

Figure 5:
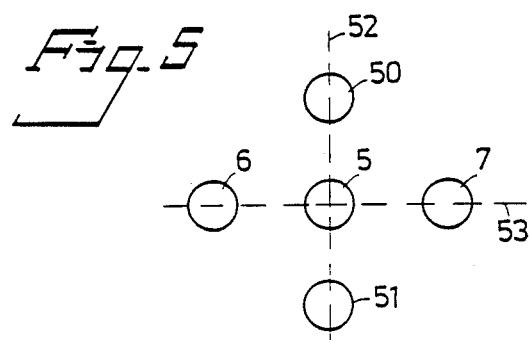
FIG. 5 illustrates one embodiment of an antenna configuration according to the invention.

According to a further embodiment, illustrated in FIG. 5, a further two receiver antennae 50, 51 are located, preferably in a straight line, on respective sides of the transmitter antenna 5, this line 52 forming an angle with the line 53 extending between the first mentioned receiver antennae 6, 7 and the transmitter antenna 5.

FIG. 5 illustrates such an antenna arrangement in a view which corresponds to a view from beneath in FIG. 1.

As with the receiver antennae 6, 7 of the previous embodiments, the further receiver antennae 50, 51 are connected to a circuit corresponding to that described with reference to FIGS. 2 and 3.

This embodiment enables the relative speed between two objects to be measured in two different directions while utilizing solely one transmitter antenna and microwave generator.

It will be obvious that the present invention removes the drawbacks and problems mentioned in the introduction.

Various exemplifying embodiments have been described in the aforegoing. It is obvious that the construction of the described circuits can be modified without departing from the inventive concept of generating with the aid of microwaves two phase-independent signals which are correlated.

The present invention shall not therefore be considered limited to the described embodiments and it will be understood that modifications can be made within the scope of the following claims.

What is claimed:

1. An arrangement for measuring speeds between a first and a second object with the aid of microwave signals and including a microwave generator which is connected to a transmitter antenna for transmitting a continuous unmodulated signal, and two receiver antenna which are preferably placed on respective sides of the transmitter antenna for receiving continuous microwave signals reflected against an object and each of which receiver antenna is connected to send said continuous signal to a respective receiver channel, a correlator connecting said receiver channels for correlating the signals received by the receiver antennae, the mutual time difference of said signals corresponding to the relative speed between the objects, wherein said microwave generator (11) is also connected to a respective mixer (13, 14, 15, 16; 42, 43) in each of the receiver channels, to which respective mixers (13-16; 42, 43), respective ones of said receiver antenna (6,7) are connected; and wherein the outputs of the respective mixers; (13–16; 42, 43) for each receiver antenna are connected to an envelope detector (19, 20; 46, 47) which is intended to detect the envelope of respective signals, there being formed as outputs of the envelope detectors, simultaneous phase independent signals which are compared in the correlator (12; 48).

2. An arrangement according to claim 1, wherein two receiver channels are provided, each including a receiver antenna (6; 7) which is connected to two mutually parallel mixers (13, 14; 15, 16); said microwave generator (11) being also connected to said mixers and thus comprising a local oscillator; a phase-shifting circuit is provided for and connected to one (14;16) of the two mixers (13,14; 15; 16) associated with each receiver and is arranged to phase-shaft the signal such that the signals ($S_4$, $S_5$) downstream of respective mixers (13, 14; 15, 16) in respective channels are in quadrature with one another; the outputs of respective mixers (13, 14; 15, 16) are connected to a respective squaring circuit (29, 30; 31, 32) which squares the signal from respective mixers; and wherein the squaring circuits (29, 30; 31, 32) are connected to an addition circuit (33, 34) which is intended to add together the signals from the two squaring circuits (29, 30; 31, 32) associated with each receiver; and further wherein the outputs of the respective addition circuits (33, 34) of the two receiver channels are connected to said correlator (12).

3. An arrangement according to claim 1 wherein a high-pass filter (25, 26, 27, 28) is arranged between respective mixers (13, 14, 15, 16) and respective squaring circuits for filtering out low-frequency variations on the transmitted microwave signal ($\omega_o$).

4. An arrangement according to claim 1, wherein said two receiver antenna (6, 7) are placed along an essentially straight line (53) extending through the receiver antenna and the transmitter antenna (5) located therebetween; a further two receiver antenna (50, 51) are located on respective sides of the transmitter antenna (59) along an essentially straight line (52) which is transverse to the first mentioned line (53); the first mentioned receiver antenna (6, 7) are individually connected to two associated receiver channels for correlating the signals received thereby; and the last mentioned receiver antenna (50, 51) are individually connected to two other associated receiver channels for correlation of the signals received thereby.

5. An arrangement for measuring speeds between a first and a second object with the aid of microwave signals and including a microwave generator which is connected to a transmitter antenna, and two receiver antennae which are preferably placed on respective sides of the transmitter antenna for receiving microwave signals reflected against an object and each of which receiver antennae is connected to a respective receiver channel, a correlator connecting said receiver channels for correlating the signals received by the receiver antenna, the mutual time difference of said signals corresponding to the relative speed between the objects, wherein said microwave generator (11) is also connected to a respective mixer (13, 14, 15, 16; 42, 43) in each of the receiver channels, to which respective mixers (13–16; 42, 43), respective ones of said receiver antenna (6, 7) are connected; and wherein the outputs of the respective mixers (13–16; 42, 43) for each receiver antenna are connected to an envelope detector (19, 20; 46, 47) which is intended to detect the envelope of respective signals, there being formed, as outputs of the envelope detectors, phase independent signals which are compared in the correlator (12; 48); the arrangement further including a sideband modulator (40) with an oscillator (41) arranged in the connection between said microwave generator (11) and said mixers (42, 43) in respective receiver channels, and generating a sideband of frequency $\omega_o + \omega_1$, where $\omega_o$ is the frequency of the microwave generator (11) and $\omega_1$ is the frequency of said oscillator (41) of the sideband modulator (40); a band elimination filter (44; 45) in respective receiver channels, downstream of their associated mixer (42, 43), to filter out the carrier frequency $\omega_1$ and low-frequency variations around the frequency $\omega_1$ and to allow high-frequency variations around the frequency $\omega_1$ to pass through; and included in each receiver channel, downstream of said band elimination filter (44; 45), an envelope detector (46; 47) to produce side phase independent output signals connected to, and to be compared in, said correlator (48).

6. An arrangement according to claim 5, wherein said two receiver antenna (6, 7) are placed along an essentially straight line (53) extending through the receiver antenna and the transmitter antenna (5) located therebetween; a further two receive, antenna (50, 51) are located on respective sides of the transmitter antenna (59) along an essentially straight line (52) which is transverse to the first mentioned line (53); the first mentioned receiver antenna (6, 7) are individually connected to two associated receiver channels for correlating the signals received thereby; and the last mentioned receiver antenna (50, 51) are individually connected to two other associated receiver channels for correlation of the signals received thereby.

* * * * *

UNITED STATES PATENT AND TRADEMARK OFFICE
CERTIFICATE OF CORRECTION

PATENT NO. : 4,922,255
DATED : May 1, 1990
INVENTOR(S) : EILERT BERGLIND

It is certified that error appears in the above-identified patent and that said Letters Patent is hereby corrected as shown below:

Column 3, lines 36 and 38 should be one continuous line.

Column 6, lines 55 and 56, change "antenna" to --antennae--.

, lines 59 and 68, (each occurrence) change "antenna" to --antennae--.

Column 7, lines 35, 37, 38 and 42 (each occurrence) change "antenna" to --antennae--.

, lines 44 and 45 change "antenna" to --antennae--.

Column 8, lines 7, 38, 40 and 45 (each occurrrence) change "antenna" to --antennae--.

, lines 12 and 13, change "antenna" to --antennae--.

UNITED STATES PATENT AND TRADEMARK OFFICE
CERTIFICATE OF CORRECTION

PATENT NO. : 4,922,255

DATED : May 1, 1990

INVENTOR(S) : EILERT BERGLIND

It is certified that error appears in the above-identified patent and that said Letters Patent is hereby corrected as shown below:

Column 8, line 41 change "receive, antenna" to --receiver antennae--.

, lines 47 and 48, change "antenna" to --antennae--.

Signed and Sealed this

Ninth Day of July, 1991

Attest:

*Attesting Officer*

HARRY F. MANBECK, JR.

*Commissioner of Patents and Trademarks*